United States Patent [19]

Davis et al.

[11] 4,349,469

[45] Sep. 14, 1982

[54] COPOLYESTERETHERS

[75] Inventors: Burns Davis; Theodore F. Gray; Harry R. Musser, all of Kingsport, Tenn.

[73] Assignee: Eastman Kodak Company, Rochester, N.Y.

[21] Appl. No.: 235,385

[22] Filed: Feb. 17, 1981

[51] Int. Cl.³ ............................................. C08G 63/18
[52] U.S. Cl. .................................... 524/765; 528/296; 528/307; 528/308; 524/769; 524/747; 524/878
[58] Field of Search ...................... 528/296, 307, 308; 260/45.8 TH, 45.8 NT

[56] References Cited

U.S. PATENT DOCUMENTS

| 3,023,192 | 2/1962 | Shivers | 528/296 |
| 3,026,264 | 3/1962 | Rocklin et al. | 260/45.95 B |
| 3,261,812 | 7/1966 | Bell et al. | 260/40 R |
| 3,502,613 | 3/1970 | Berger | 260/45.8 NT |
| 3,651,014 | 3/1972 | Witsiepe | 260/40 R |
| 4,003,882 | 1/1977 | Fagenburg et al. | 260/40 R |
| 4,013,624 | 3/1977 | Hoeschele | 524/765 |
| 4,155,889 | 5/1979 | Fagerburg et al. | 264/346 |
| 4,221,703 | 9/1980 | Hoeschele | 260/45.9 NC |
| 4,256,860 | 3/1981 | Davis et al. | 528/301 |

Primary Examiner—Maurice J. Welsh
Attorney, Agent, or Firm—John F. Stevens; Daniel B. Reece, III

[57] ABSTRACT

Disclosed are copolyesterethers having an inherent viscosity of from about 0.8 to about 1.5 comprising A. a dicarboxylic acid component consisting essentially of 1,4-cyclohexanedicarboxylic acid having a trans isomer content of at least 70%, and B. a glycol component consisting essentially of
  (1) 1,4-cyclohexanedimethanol, and
  (2) from about 15 to about 50 weight percent, based on the weight of the polyesterether, of polytetramethyleneether glycol having a molecular weight of about 500 to about 1100, C. from about 0.1 to about 1.5 mole %, based on the mole % of the acid or glycol component, of a branching agent having at least three COOH or OH functional groups and from 3 to 60 carbon atoms, said copolyesterethers being characterized by having a die swell of between about −90% and about +100% and a minimum crystallization time of less than 2.5 minutes.

25 Claims, No Drawings

COPOLYESTERETHERS

BACKGROUND OF THE INVENTION

1. Field of the Invention

This invention relates to elastomeric copolyesterethers based on poly(1,4-cyclohexanedimethylene 1,4-cyclohexanedicarboxylate) modified with polytetramethylene ether glycol which may be extrusion blown into objects such as clear flexible bags or film.

The ability to be blow molded results largely from high melt strength. A polymer having good melt strength is described as one which can support its own weight in the molten state after being extruded from a die. When a polymer without good melt strength is melt extruded downward from a die, the melt rapidly drops and forms a thin string or breaks. Such polymers are not useful for extrusion blow molding objects. When polymers have sufficient melt strength they can be extruded downward in the shape of a hollow cylinder. Containers can be formed by clamping a mold around a molten hollow cylinder (which has been extruded) and subjecting the hollow cylinder to internal pressure to form the bottle, a practice which is well known to those skilled in the art.

2. Background Art

Copolyesterethers derived from 1,4-cyclohexanedicarboxylic acid, 1,4-cyclohexanedimethanol and polytetramethyleneether glycol are known in the art. U.S. Pat. Nos. of interest include No. 4,003,882 to Fagerburg et al; 3,261,812 to Bell et al, 3,023,192 to Shivers; 4,221,703 to Hoeschele; and 3,651,014 to Witsiepe. Also, copending Ser. No. 106,963 of Davis et al, and now U.S. Pat. No. 4,256,860, issued Mar. 17, 1982 relates to such copolyesterethers derived from polypropyleneether glycol. It is not believed to have been known in the art, however, that if such copolyesterethers are derived from 1,4-cyclohexanedimethanol and 1,4-cyclohexanedicarboxylic acid having high trans isomer contents within a particular range, modified with polytetramethyleneether glycol of a molecular weight within a certain range and in certain amounts, and containing a branching agent, the desirable properties described herein for the present invention would be achieved.

DESCRIPTION OF THE INVENTION

According to the present invention, a copolyesterether having an I.V. of about 0.8 to about 1.5 is provided. The polymer has high melt strength, thus allowing articles to be blow molded from the molten polymer. Other desirable properties which make the polymer especially useful in the manufacture of products such as medical supplies include its high level of clarity and low odor. Furthermore, the polymer has a fast crystallization rate, allowing reasonably fast rates of production for molded articles such as bags, bottles or cast film.

The copolyesterethers according to this invention are derived from a dicarboxylic acid component consisting essentially of 1,4-cyclohexanedicarboxylic acid or an ester forming derivative thereof such as dimethyl-1,4-cyclohexanedicarboxylate. This acid and ester are both sometimes referred to herein as DMCD. The diol component consists essentially of 1,4-cyclohexanedimethanol (CHDM) and polytetramethylene ether glycol (PTMG). The copolyesterethers further comprise from about 0.1 to about 1.5 mole %, based on the acid or glycol component, of a polyfunctional branching agent having at least 3 carboxyl or hydroxyl groups.

The dibasic acid component of the copolyesterether of this invention consists essentially of DMCD having a trans isomer content of at least 70%, preferably at least 80% and most preferably at least 85%.

The glycol component of this invention includes CHDM, which also preferably has a high trans isomer content, for example, at least 60%.

DMCD and CHDM are well known in the art and commercially available. "Man-Made Fibers: Science and Technology," Vol. III, edited by Mark, Atlas and Cernia, published by Interscience Publishers describes preparation of DMCD and CHDM at page 85.

The PTMG component of this invention is commercially available, and is prepared by well known techniques. The PTMG used in the copolyesterether of this invention has a molecular weight of between about 500 and about 1100, preferably about 1000. It is used in an amount of from about 15 to about 50%, preferably about 20–35%, based on the total weight of the copolyesterether. It is interesting to note that if the molecular weight of the PTMG approaches 2000, the surface of film produced therefrom shows a white deposit.

The copolyesterether of this invention further comprises from about 0.1 to about 1.5 mole %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane, trimethylol propane, and trimer acid.

It should be understood that the total acid reactants should be 100 mole %, and the total glycol reactants should be 100 mole %. Although the acid reactant is said to "consist essentially of" DMCD, if the branching agent is a polybasic acid or anhydride, it will be calculated as part of the 100 mole % acid. Likewise, the glycol reactant is said to "consist essentially of" CHDM and PTMG, if the branching agent is a polyol, it will be calculated as part of the 100 mole % glycol. Although for convenience the PTMG is specified in weight percent, the total mole % of PTMG, CHDM and polyol if used, combine to make 100 mole % glycol.

The copolyesterethers of this invention preferably include a phenolic antioxidant that is capable of reacting with the polymer intermediates. This causes the antioxidant to become chemically attached to the copolyesterether and be essentially nonextractable from the polymer. Antioxidants useful in this invention should contain one or more of an acid, hydroxyl, or ester group capable of reacting with the reagents used to prepare the copolyesterether. It is preferred that the phenolic antioxidant be hindered and relatively non-volatile. Examples of suitable antioxidants include hydroquinone, arylamine antioxidants such as 4,4'-bis($\alpha$,$\alpha$-dimethylbenzyl)diphenylamine, hindered phenol antioxidants such as 2,6-di-tert-butyl-4-methylphenol, butylated p-phenyl-phenol and 2-($\alpha$-methylcyclohexyl)-4,6-dimethylphenol; bis-phenols such as 2,2'-methylenebis-(6-tert-butyl-4-methylphenol), 4,4'bis(2,6-di-tert-butylphenol), 4,4'-methylenebis(6-tert-butyl-2-methylphenol), 4,4'-butylene-bis(6-tert-butyl-3-methylphenol), methylenebis(2,6di-tertbutylphenol), 4,4'-thiobis(6-tert-butyl-2-methylphenol), and 2,2'-thiobis(4-methyl-6-tert-butylphenol); tris-phenols such as 1,3,5-tris(3,5-di-tertbutyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite; and tetrakis[methylene(3,5-di-tert-butyl-4-hydroxyhydrocinnamate)methane] which is commercially available from Geigy Chemical Company as Irganox 1010 antioxidant, is preferred. Preferably, the antioxidant is used in an amount of from about 0.1 to about 1.0, based on the weight of copolyesterether.

Copolyesterethers of this invention are further characterized by their good melt strength. A polymer having melt strength is described as one capable of supporting itself on being extruded downward from a die in the melt. When a polymer with melt strength is extruded downward, the melt will hold together. When a polymer without melt strength is extruded downward, the melt rapidly drops and breaks. For purposes of comparison, the melt strength is measured at a temperature 20° C. above the melting peak.

Melting point or maximum peak during melting is determined on a differential scanning calorimeter Model DSC-2 from Perkin-Elmer Company at a heating rate of 20° C. per minute.

Melt strength is measured by extruding molten polymer through a die 0.1 inch in diameter and 0.25 inch long with a shear rate of 20 reciprocal seconds. The extrudate is allowed to fall freely from the die exit under gravity. The diameter of the extrudate supporting a six inch length of the extrudate is measured. If the extrudate is less than 0.1 inch in diameter, the die swell is then a negative number because there is no swell. If the extrudate is larger than 0.1 inch in diameter, the die swell is a positive number. The die swell is expressed as a percent. It is calculated as follows using a 0.1 inch diameter die.

Die Swell, Percent =

$$\frac{\text{Diameter in inches of Extrudate at six inches} - 0.1 \text{ inch}}{0.1 \text{ inch}} \times 100$$

A die swell of 0% therefore indicates no change in the size of the extrudate.

Copolyesterethers of this invention are described as having a die swell of greater than −90% and as a practical matter, die swell would not exceed about +100%. Preferably, the die swell is greater than −50% and less than +50%. The die swell of a copolyesterether can be increased by increasing the inherent viscosity or branching or both.

The trans and cis isomer contents of the final copolyesterether are controlled in order to give polymers that setup or crystallize rapidly. Cis and trans isomer contents are measured by conventional methods well known to those skilled in the art. Copolyesterethers similar to those of this invention that have a low glass transition temperature and do not crystallize are sticky and tacky and cannot be used for forming useful objects. Copolyesterethers that crystallize slowly require long processing times. Therefore, to decrease processing time it is highly desirable to use rapidly crystallizing polyesterethers. The rates of crystallization of copolyesterethers can be measured by determining the times ($t_p$) to reach the peak crystallization exotherm during crystallization at various temperatures. Typically, there exists a temperature at which $t_p$ is less than for any other temperature. This minimum value of $t_p$ may be called $t_{min}$ and can be used as a single parameter characterization of crystallization rate. The shorter the minimum crystallization time ($t_{min}$) the faster the copolyesterether will crystallize. A $t_{min}$ of less than about 2.5 minutes is desirable. A $t_{min}$ of about one minute or even 0.5 minute is even more preferred.

Although there are different ways of measuring $t_{min}$ known to those skilled in the art, one suitable method is as follows:

One of the commonly used parameters for describing the crystallization rate of a polymer is the crystallization half-time, $t_{\frac{1}{2}}$. The crystallization half-time is simply the time at which the crystallization of the originally amorphous sample is half completed according to the method used to monitor crystallinity. The half-time is strongly dependent on the crystallization temperature.

The isothermal crystallization of a polymer can be approximately described by the Avrami equation $$X = X_o(1 - e^{-(\frac{t}{a})^n}) \quad (1)$$

where $X_o$ is the limiting value of the crystallinity, "a" is a characteristic time determined by the polymer and the crystallization temperature, and n is the so-called Avrami exponent, generally in the range 2.0 to 3.5. The reduced crystallization half-time, $(t/a)_{\frac{1}{2}}$, is obtained by solving $$\frac{X}{X_o} = \frac{1}{2} = 1 - e^{-(\frac{t}{a})^n \frac{1}{2}} \quad (2)$$

to get $$\left(\frac{t}{a}\right)_{\frac{1}{2}} = n \ln 2 \quad (3)$$

The Differential Scanning Calorimeter (DSC) response obtained would be described by differentiating equation (1) with respect to time to get the time rate of change of crystallinity, i.e., $$\frac{dX}{dt} = X_o \frac{n}{a}\left(\frac{t}{a}\right)^{n-1} e^{-(\frac{t}{a})^n} \quad (4)$$

This function has a maximum for all $n > 1$. Differentiating equation 4 with respect to time, setting the derivative equal to zero and solving for $t/a$, one finds the maximum of $dX/dt$, which is the peak of the DSC curve, to be located at $$\frac{t_p}{(a)} = n\frac{n-1}{n} \quad (5)$$

The ratio of $$\frac{t_p}{(a)} \text{ to } \left(\frac{t}{a}\right)_{\frac{1}{2}}, \frac{\left(\frac{t_p}{a}\right)}{\left(\frac{t}{a}\right)_{\frac{1}{2}}} = \frac{t_p}{t_{\frac{1}{2}}} = n\frac{n-1}{n \ln 2} \quad (6)$$

The ratio $(t_p/t_{\frac{1}{2}})$ is between 0.85 and 1.04 for $n \geq 2$.

Normally, the curve of $t_p$ vs. crystallization temperature is a sufficiently good approximation of the curve $t_{\frac{1}{2}}$ vs. crystallization temperature.

The following procedure is used to determine $t_{min}$ for copolyesterethers of this invention. The melting point or maximum peak during melting for the copolyesterethers is determined on a DSC. The copolyesterether is then taken to 40° C. above the melting point in a DSC, cooled at a rate of 320° C./minute to a temperature close to the $t_{min}$, and held at this temperature until the crystallization peak occurs. It may be necessary to try several temperatures before a crystallization peak is found. The peak crystallization is then determined over a range of temperatures. A plot of peak crystallization times, $t_p$, versus temperatures at which the peak crystallization times are determined is made and a smooth curve drawn through the points. The $t_{min}$ for the copolyesterether is then the minimum point on the curve.

Other methods of determining crystallization half times are known in the art, for example, as disclosed in "Polymer," 1972, Vol. 13, July, entitled "Effect of Chemical Structure on Crystallization Rates and Melting of Polymers: Part 1. Aromatic Polyesters" by Gilbert and Hybart.

The following examples are submitted for a better understanding of the invention.

EXAMPLE 1

This example represents a general procedure which can be used to prepare the copolyesterethers of this invention. Other procedures are known in the art. For example, see U.S. Pat. Nos. 3,023,192; 3,013,914 and 3,763,109. Poly(1,4-cyclohexanedimethylene-1,4-cyclohexanedicarboxylate) modified with 18 weight percent of 1000 molecular weight polytetramethyleneether glycol, 0.20 mole percent of trimellitic anhydride, and 0.20 weight percent of Irganox 1010 is prepared by combining 90.42 grams (0.4521 moles) of dimethyl-1,4-cyclohexanedicarboxylate, 64.40 grams (0.447 moles) of 1,4-cyclohexanedimethanol, 27.04 grams (0.02704 moles) of 1000 molecular weight polytetramethyleneether glycol, 0.17 grams (0.000885 moles) of trimellitic anhydride, 0.30 grams (0.20 weight percent of total polymer prepared) of Irganox 1010, and 150 parts per million of titanium from acetyl triisopropyl titanate. These reagents are calculated on the bases of preparing 150 grams of polymer. The dimethyl-1,4-cyclohexanedicarboxylate used contains 96.5 percent of the trans isomer and 3.5 percent of the cis isomer. The 1,4-cyclohexanedimethanol contains 45 percent of the trans isomer and 55 percent of the cis isomer. The amount of 1,4-cyclohexanedimethanol used in preparation of the polymer is five mole percent greater than that needed to prepare the theoretical polymer. The reactants are heated with stirring under nitrogen in a 220° C. metal bath. screen. Results of analysis of the polymer are shown in Table 1. Table 1 also shows the results obtained on other compositions described in this invention.

The amount of excess CHDM used in preparation of the copolyesterethers of this invention should be kept between about one and about 10 mole percent. High excesses of CHDM seriously reduce the polycondensation rate. The preferred excess is between about one and about five mole percent. A theoretical amount can be used but it is difficult to obtain equivalent amounts of acid and hydroxyl. Above about 10 mole percent excess CHDM, the polycondensation rate is reduced, so that the time for reaching a particular I.V. is increased under a given temperature and pressure. The I.V. must be built up in a reasonable time before excess degradation occurs.

In addition to the process described in Example 1, the copolyesterethers can be polymerized in the solid phase using conventional procedures. A relatively low inherent viscosity copolyesterether prepared as in Example 1 is heated at a temperature up to about 5° C. of the melting point in a flow of inert gas or at a reduced pressure. The copolyesterether should have an inherent viscosity of at least 0.80.

TABLE 1

| Example | Inherent Viscosity | Trans Isomer Content, % | | PTMG, Wt. % | $t_{min}{}^a$ | Tm, °C. | Die Swell | |
| --- | --- | --- | --- | --- | --- | --- | --- | --- |
| | | DMCD | CHDM | | | | Temperature, °C. | % Swell |
| 2 | 1.16 | 91.7 | 47.7 | 18 | 0.3 | 194 | 214 | −14 |
| 3 | 1.03 | 96.6 | 5.1 | 25 | 0.6 | 188 | 208 | −50 |
| 4$^b$ | 1.48 | 93.6 | 3.8 | 18 | 0.7 | 211 | 231 | 22 |
| 5 | 1.24 | 96.5 | 5.9 | 50 | 0.6 | 155 | 175 | −74 |
| 6 (Control) | 0.93 | 30.2 | 7.9 | 50 | Did not crystallize. | | | |
| 7 | 0.93 | 89.7 | 99.2 | 18 | 0.2 | 239 | 259 | −84 |
| 8 (Control) | 1.00 | 77.0 | 62.1 | 18 | 3.2 | Crystallizes too slowly. | | |
| 9 | 0.90 | 85 | 66 | 30 | 0.4 | 193 | 213 | −85 |

$^a$Time to reach the peak of crystallization exotherm.
$^b$Polymerized in the melt to 0.89 inherent viscosity then solid phase polymerized at 185° C. at reduced pressure to 1.48 inherent viscosity.

EXAMPLES 10–15

Six copolyesterethers are prepared using the procedure described in Example 1. These examples show the effect of using a branching agent on the polycondensation rate and the die swell of copolyesterether of this invention. The results are shown in Table II. Table II shows that the use of 0.6 mole percent trimellitic anhydride results in a much faster polycondensation rate in reaching a certain inherent viscosity than when the trimellitic anhydride is not used. Table II shows that copolyesterethers of this invention have higher die swell at a given inherent viscosity than copolyesterethers of prior art.

TABLE II

| Example | Mole Percent Trimellitic Anhydride | Polycondensation Time, min. | Inherent Viscosity | Tm, °C., Polymer Melting Temperature | Die Swell Temperature, °C. | % Swell |
|---|---|---|---|---|---|---|
| 10[a] | None | 90 | 1.31 | 207 | 227 | −28 |
| 11[b] | 0.60 | 20 | 1.35 | 205 | 225 | 44 |
| 12[a] | None | 30 | 1.25 | 206 | 226 | −34 |
| 13[b] | 0.60 | 14 | 1.20 | 207 | 227 | 5 |
| 14[a] | None | 25 | 1.11 | 201 | 221 | −72 |
| 15[b] | 0.6 | 11 | 1.10 | 200 | 220 | −31 |

[a]Poly(1,4-cyclohexylenedimethylene-1,4-cyclohexanedicarboxylate modified with 30 wt. % of 1000 Mol. Wt. polytetramethyleneether glycol.
[b]Same as "a" composition but contains 0.60 mole percent trimellitic anhydride.

The copolyesterethers of this invention may be molded or cast into useful articles such as flexible containers or film by conventional methods.

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

We claim:

1. Copolyesterethers having an inherent viscosity of from about 0.8 to about 1.5 comprising
   A. a dicarboxylic acid component consisting essentially of 1,4-cyclohexanedicarboxylic acid having a trans isomer content of at least 70%,
   B. a glycol component consisting essentially of
      (1) 1,4-cyclohexanedimethanol, and
      (2) from about 15 to about 50 weight percent, based on the weight of the polyesterether, of polytetramethyleneether glycol having a molecular weight of about 500 to about 1100 and
   C. from about 0.1 to about 1.5 mole %, based on the mole % of the acid or glycol component, of a branching agent having at least three COOH or OH functional groups and from 3 to 60 carbon atoms, said copolyesterether being characterized by having a die swell of between about −90% and about +100% and a minimum crystallization time of less than 2.5 minutes.

2. Copolyesterethers according to claim 1 wherein the 1,4-cyclohexanedicarboxylic acid has a trans isomer content of at least 80% and the 1,4-cyclohexanedimethanol has a trans isomer content of at least 60%.

3. Copolyesterethers according to claim 1 wherein the 1,4-cyclohexanedicarboxylic acid has a trans isomer content of at least 85% and the 1,4-cyclohexanedimethanol has a trans isomer content of at least 60%.

4. Copolyesterethers according to claim 1 wherein the molecular weight of the polytetramethylene ether glycol is about 500–1000.

5. Copolyesterethers according to claim 1 wherein the polytetramethylene ether glycol is present in an amount of about 20–35% based on the total weight of the copolyesterether.

6. Copolyesterethers according to claim 1 wherein the branching agent is trimellitic anhydride.

7. Copolyesterethers having an inherent viscosity of from about 0.8 to about 1.5 comprising
   A. a dicarboxylic acid component consisting essentially of 1,4-cyclohexanedicarboxylic acid having a trans isomer content of at least 70%,
   B. a glycol component consisting essentially of
      (1) 1,4-cyclohexanedimethanol,
      (2) from about 15 to about 50 weight percent, based on the weight of the polyesterether, of polytetramethyleneether glycol having a molecular weight of about 500 to about 1100,
   C. from about 0.1 to about 1.5 mole %, based on the mole % of the acid or glycol component, of a branching agent having at least three COOH or OH functional groups and from 3 to 60 carbon atoms, and
   D. an effective amount of a phenolic antioxidant, said copolyesterether being characterized by having a die swell of between about −90% and about +100% and a minimum crystallization time of less than 2.5 minutes.

8. Copolyesterethers according to claim 7 wherein the antioxidant is present in an amount of about 0.1–1.0 based on the weight of the copolyesterether.

9. Copolyesterethers according to claim 1 wherein the die swell is between about −50% and +50%.

10. Copolyesterethers according to claim 1 wherein the minimum crystallization time is less than one minute.

11. Copolyesterethers according to claim 1 wherein the minimum crystallization time is less than one-half minute.

12. Copolyesterethers having an inherent viscosity of from about 0.8 to about 1.5 comprising
   A. a dicarboxylic acid component acid component consisting essentially of 1,4-cyclohexanedicarboxylic acid having a trans isomer content of at least 80%,
   B. a glycol component consisting essentially of
      (1) 1,4-cyclohexanedimethanol having a trans isomer content of at least 60%, and
      (2) from about 20 to about 35 weight percent, based on the weight of the polyesterether, of polytetramethylene ether glycol having a molecular weight of about 500 to about 1000, and
   C. from about 0.1 to about 1.5 mole %, based on the mole % of the acid or glycol component, of a branching agent having at least three COOH or OH functional groups and from 3 to 60 carbon atoms,
said copolyesterether being characterized by having a die swell of between about −90% and about +100% and a minimum crystallization time of less than 2.5 minutes.

13. Copolyesterethers according to claim 12 characterized by having a die swell of between about −50% and about +50%.

14. Copolyesterethers according to claim 12 characterized by having a minimum crystallization time of less than 1 minute.

15. Copolyesterethers according to claim 12 characterized by having a die swell of between about −50% and about +50%, and a minimum crystallization time of less than 1 minute.

16. A molded article of manufacture produced from the copolyesterether according to claim 1.

17. A molded article of manufacture produced from the copolyesterether according to claim 7.

18. A molded article of manufacture produced from the copolyesterether according to claim 12.

19. An extrusion blow molded article of manufacture produced from the copolyesterether according to claim 1.

20. An extrusion blow molded article of manufacture produced from the copolyesterether according to claim 7.

21. An extrusion blow molded article of manufacture produced from the copolyesterether according to claim 12.

22. A film of the copolyesterether of the composition according to claim 1.

23. A film of the copolyesterether of the composition according to claim 7.

24. A film of the copolyesterether of the composition according to claim 12.

25. The process for preparing copolyesterethers having an inherent viscosity of from about 0.8 to about 1.5, said copolyesterether comprising a dicarboxylic acid component consisting essentially of 1,4-cyclohexanedicarboxylic acid having a trans isomer content of at least 70%, a glycol component consisting essentially of (1) 1,4-cyclohexanedimethanol, and (2) from about 15 to about 50 weight percent, based on the weight of the polyesterether, of polytetramethyleneether glycol having a molecular weight of about 500 to about 1100, from about 0.1 to about 1.5 mole %, based on the mole % of the acid or glycol component, of a branching agent having at least three COOH or OH functional groups and from 3 to 60 carbon atoms, said copolyesterether being characterized by having a die swell of between about −90% and about +100% and a minimum crystallization time of less than 2.5 minutes, said process comprising carrying out the polycondensation reaction using a molar excess of 1,4-cyclohexanedimethanol of about 1-10%.

* * * * *